(12) United States Patent
Vincent

(10) Patent No.: US 7,295,203 B2
(45) Date of Patent: Nov. 13, 2007

(54) DETERMINING REGIONS THAT ARE OCCLUDED FROM AN OBSERVATION POINT

(75) Inventor: Andrew M. Vincent, Florey (AU)

(73) Assignee: Microsoft Corporation, Redmond, WA (US)

( * ) Notice: Subject to any disclaimer, the term of this patent is extended or adjusted under 35 U.S.C. 154(b) by 127 days.

(21) Appl. No.: 11/191,695

(22) Filed: Jul. 27, 2005

(65) Prior Publication Data

US 2007/0018976 A1 Jan. 25, 2007

Related U.S. Application Data

(63) Continuation of application No. 11/069,628, filed on Mar. 1, 2005, now Pat. No. 7,170,154, which is a continuation of application No. 10/014,879, filed on Dec. 11, 2001, now Pat. No. 6,970,164.

(60) Provisional application No. 60/255,883, filed on Dec. 18, 2000.

(51) Int. Cl.
*G06T 15/00* (2006.01)
(52) U.S. Cl. ............... 345/421; 345/419; 345/619
(58) Field of Classification Search ............... 345/419, 345/421, 619, 620
See application file for complete search history.

(56) References Cited

U.S. PATENT DOCUMENTS 4,645,459 A 2/1987 Graf et al. ............... 434/43
6,747,649 B1 6/2004 Sanz-Pastor et al. ........ 345/428
6,970,164 B1 * 11/2005 Vincent et al. ............. 345/421
7,170,514 B2 * 1/2007 Vincent et al. ............. 345/421

OTHER PUBLICATIONS

Szenberg, et al. "An Algorithm for the Visualization of a Terrain with Objects", Computer Graphics Y Image Processing Proceedings, Oct. 1997, pp. 103-110.
Dollner, et al., "Texturing Techniques for Terrain Visualization", Proceedings of the Conference on Visualization, Oct. 2002, pp. 227-235.
Lloyd, et al., "Horizon Occlusion Culling for Realtime Rendering of Hierarchical Terrains", Proceedings of the Conference on Visualization, Oct. 2002, pp. 1-7.

* cited by examiner

*Primary Examiner*—Phu K Nguyen

(57) ABSTRACT

A method and system for defining a horizon on the surface with reference to the observation point, and identifying a region within the space that is beneath the horizon. Identifying a region that is beneath the horizon includes projecting a ray from the observation point that intersects the horizon and defines an area that is occluded from the observation point. The method and system may also include determining the depth of the region that is beneath the horizon and disregarding this region when the depth is less than a predetermined threshold. In addition, the method and system may identify a region within the space that is beyond the horizon.

13 Claims, 11 Drawing Sheets

DETERMINING REGIONS THAT ARE OCCLUDED FROM AN OBSERVATION POINT

CROSS-REFERENCE TO RELATED APPLICATIONS

This is a continuation of U.S. patent application Ser. No. 10/014,879, filed Dec. 11, 2001 now U.S. Pat. No. 6,970, 164, and U.S. patent application Ser. No. 11/069,628, filed Mar. 1, 2005 now U.S. Pat. No. 7,170,514. This application also claims priority to U.S. Provisional Patent Application No. 60/255,883, filed Dec. 18, 2000.

TECHNICAL FIELD

This application relates to computer graphics and image processing. More particularly, the present application relates to a method and system for determining portions of a geographic terrain surface that are occluded from an observation point.

BACKGROUND

Geographic terrain defines the dynamics of operations involving the monitoring of objects through sensors, such as radar. For example, a terrain's shape can create regions that are occluded (i.e., not visible) from a sensor placed at a particular location. These occluded regions inhibit the detection of objects, such as vehicles and people. Furthermore, the existence of such regions undermines the confidence placed by tactical operators, such as air traffic controllers, in the efficacy of monitoring systems employing such sensors.

To effectively detect the presence and activity of objects, a working knowledge of a geographic terrain is an important asset. This knowledge enables an optimal placement of sensors. To aid in the development of such knowledge, high-resolution digital elevation models providing precise graphical models of geographic terrain are becoming increasingly available. These models enable quick and efficient analysis of terrain by processing platforms, such as computers.

Accordingly, what is needed is a computer-based tool that, from a graphical terrain model, assesses visibility. In one application, visibility needs to be assessed from observation point(s) to assist operators of systems involving sensors to provide effective monitoring of objects.

SUMMARY

Described herein is a system, method, and computer program product for determining portions of a surface within a space that are occluded from an observation point. In the described implementation, a horizon is defined with reference to the observation point; and a region within the space that is beneath the horizon is identified. A ray is projected from the observation point that intersects the horizon and defines an area that is occluded from the observation point.

The described implementations, therefore introduce the broad concept of generating knowledge of terrain, which advantageously provides for the effective monitoring of objects.

BRIEF DESCRIPTION OF THE DRAWINGS

In the drawings, the left-most digit(s) of a reference number identifies the drawing in which the reference number first appears.

DETAILED DESCRIPTION

Figure 1:
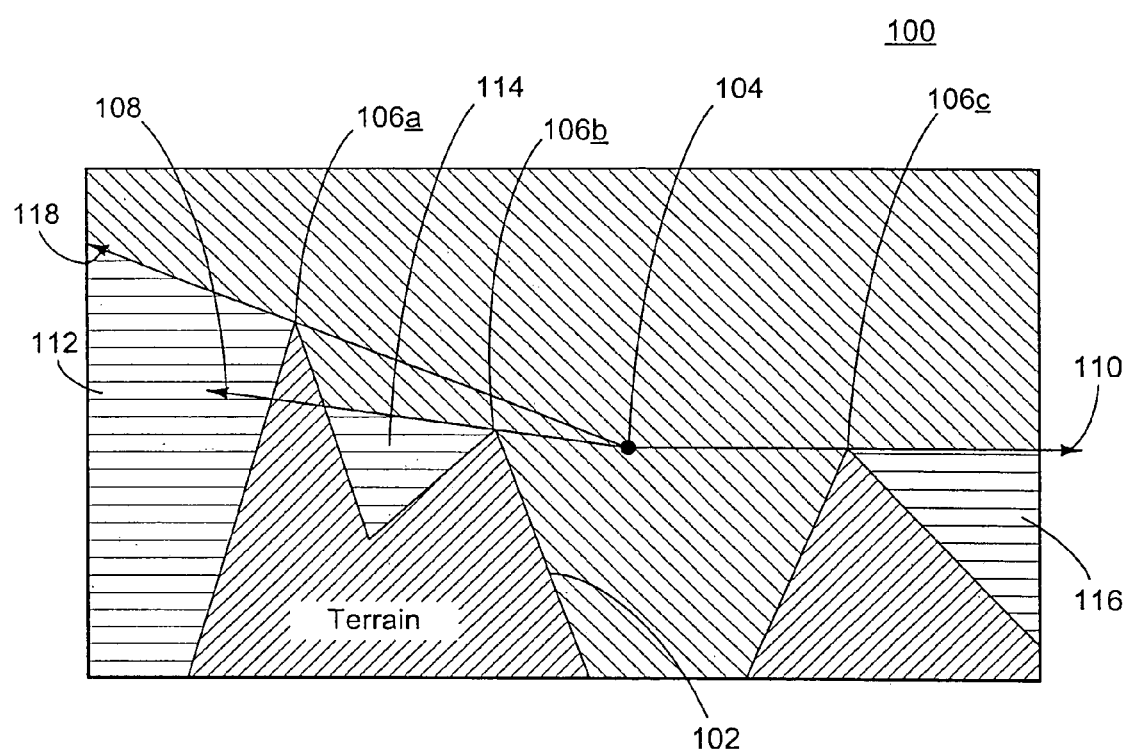
FIG. 1 is a cross-sectional view of a-three-dimensional strategic space.

FIG. 1 is a cross-sectional view of a three-dimensional strategic space 100. Strategic space 100 includes a terrain surface 102 and an exemplary observation point 104. Terrain surface 102 is a three-dimensional surface defined using a triangle mesh. However, other surface models, such a quadrilateral mesh, can be used. Terrain surface 102 includes a plurality of peaks (also referred to herein as apexes) 106a-c.

As shown in FIG. 1, observation point 104 is not disposed. on terrain surface 102. Rather, observation point 104 is above terrain surface 102. Thus, observation point 104 is supported by an aerial platform, such as an airplane, a helicopter, a missile, or a satellite. Although observation point 104 is above terrain surface 102, other observation point(s) can be disposed on terrain surface 102, and beneath terrain surface 102 (i.e., in subterranean locations).

Three exemplary lines of sight (LOSs) 108, 110, and 118 are projected from observation point 104. Each of LOSs 108, 110, and 118 indicates portions of terrain surface 102 that obstruct the collection of tactical data by an image gathering sensor located at observation point 104. Examples of image gathering sensors include visible light sensors, infrared (IR) light sensors, ultraviolet (UV) light sensors, and radar.

LOSs 108, 110, and 118 show that terrain surface 102 occludes regions from observation point 104. For instance, FIG. 1 illustrates three such occluded regions 112, 114, and 116.

Occluded regions 112, 114, and 16, as illustrated in FIG. 1, are cross-sectional areas that represent portions of three-dimensional strategic space 100. These portions are not visible to an observer (i.e., a sensor) located at observation point 104.

The described exemplary implementations herein provide a technique for identifying occluded cross-sectional areas. From such cross-sectional areas, three-dimensional volumes that are occluded from an observation point, such as observation point 104, can be derived.

Figure 2:
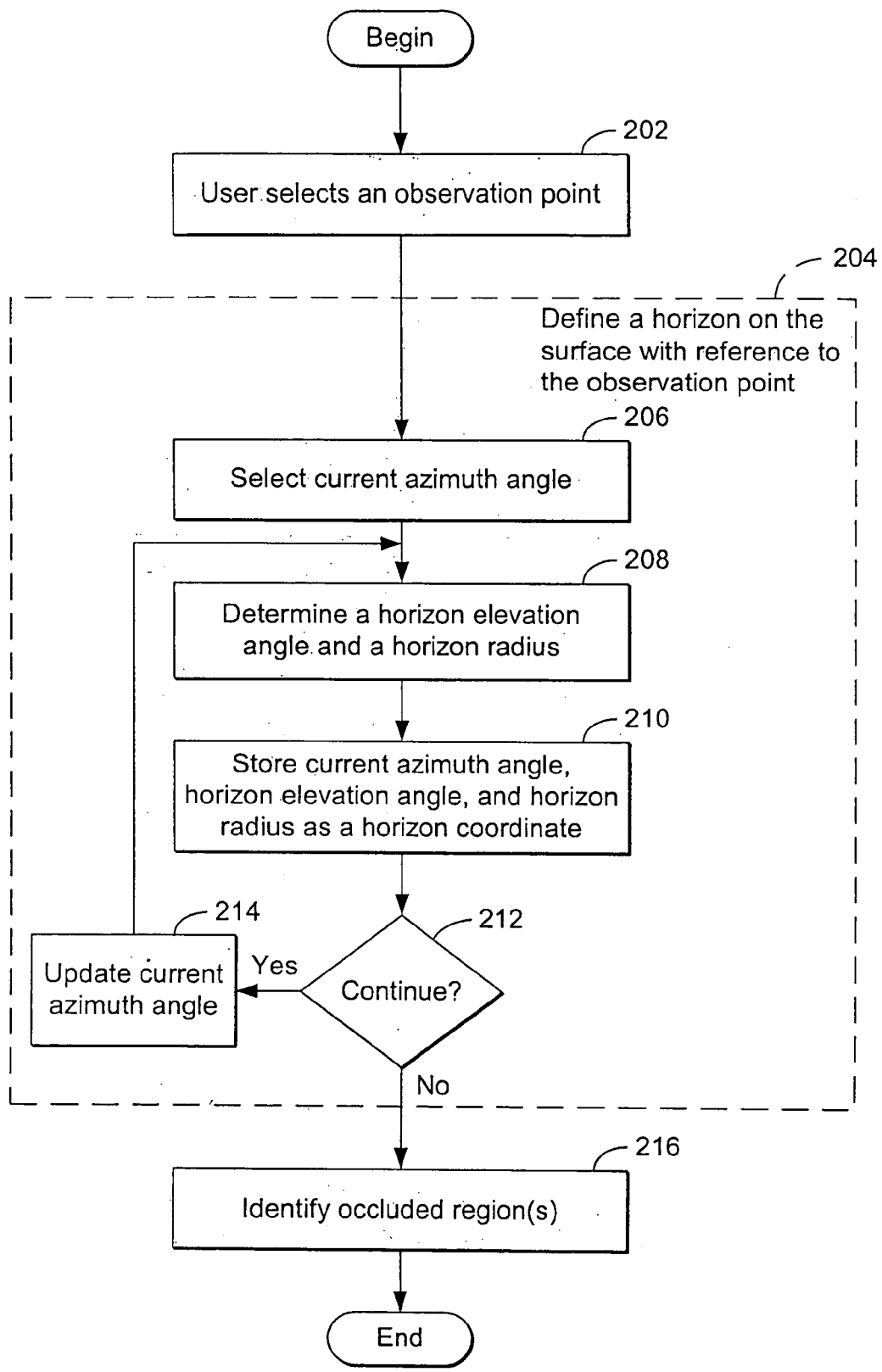
FIG. 2 is a flowchart illustrating an operational sequence directed to identifying occluded regions.

FIG. 2 is a flowchart illustrating an operational sequence directed to identifying occluded regions (steps 202-216). The steps in FIG. 2 are described with reference to terrain surface 102 and observation point 104. However, these steps can be applied to other terrains, surfaces, and observation points, as would be apparent to persons skilled in the relevant art(s).

The operation illustrated with reference to FIG. 2 commences with a step 202. In this step, a user selects an observation point, such as observation point 104. As described above with reference to FIG. 1, this observation point can be disposed on, above, or beneath terrain surface 104.

Next, in a step 204, a horizon contour on terrain surface 102 is defined with reference to observation point 104. This step comprises generating a plurality of horizon coordinates, where each horizon coordinate includes an azimuth angle and a elevation angle. Together, these horizon coordinates provide a set of samples that form a horizon contour. This horizon contour azimuthally surrounds observation point 104. An exemplary horizon contour is described below with reference to FIG. 6.

By using observation point 104 as the origin of a spherical coordinate system, an azimuth angle, an elevation angle, and a radius define a point in three-dimensional strategic space 100. These values can be used to form a coordinate system to define strategic space 100.

As shown in FIG. 2, performance of step 204 comprises the performance of steps 206 through 214. In step 206, an initial azimuth angle is selected. An azimuth angle is a horizontal angle measured from a reference direction, usually due north, of a ray that is projected from observation point 104.

Next, in a step 208, a horizon elevation angle and a horizon radius are determined from the observation point selected in step 202. An elevation angle is an angle that a ray projected from observation point 104 makes with a horizontal plane. For a particular azimuth angle, a horizon elevation angle is the largest elevation angle at which a ray projected from observation point 104 intersects an apex on surface 102. For such an intersection, the horizon radius is the distance along the projected ray from observation point 104 to the point of intersection. Performance of step 208 is described in greater detail below with reference to FIG. 3.

In a step 210, the azimuth angle, horizon elevation angle, and horizon radius are stored as one of a plurality of horizon coordinates. Together, this plurality of horizon coordinates defines a horizon contour.

A step 212 follows the performance of step 210. In this step, it is determined whether to continue with the generation of horizon coordinates. If the generation of horizon coordinates is to continue, then a step 214 is performed. Otherwise, operation proceeds to a step 216. For example, horizon coordinates can continue to be generated until a complete (or nearly complete) horizon contour has been formed. In this case, step 212 comprises the step of determining whether a complete horizon contour has been formed. A complete horizon contour has been formed if the azimuth angle of the most recently stored horizon coordinate is within a predetermined threshold of a 360 degrees azimuthal rotation from the initial azimuth angle selected in step 206.

In a step 214, the azimuth angle stored during the most recent performance of step 210 is updated. Control then proceeds to continue the generation of a new horizon coordinate through the performance of steps 206 through 210. The performance of step 214 is described in greater detail with reference to FIG. 5. After completion of step 214, operation returns to step 208.

As described above, if the generation of horizon coordinates pursuant to step 204 is complete, then a step 216 is performed. In step 216, occluded region(s), such as regions 112, 114, and 116, are identified.

Figure 3:
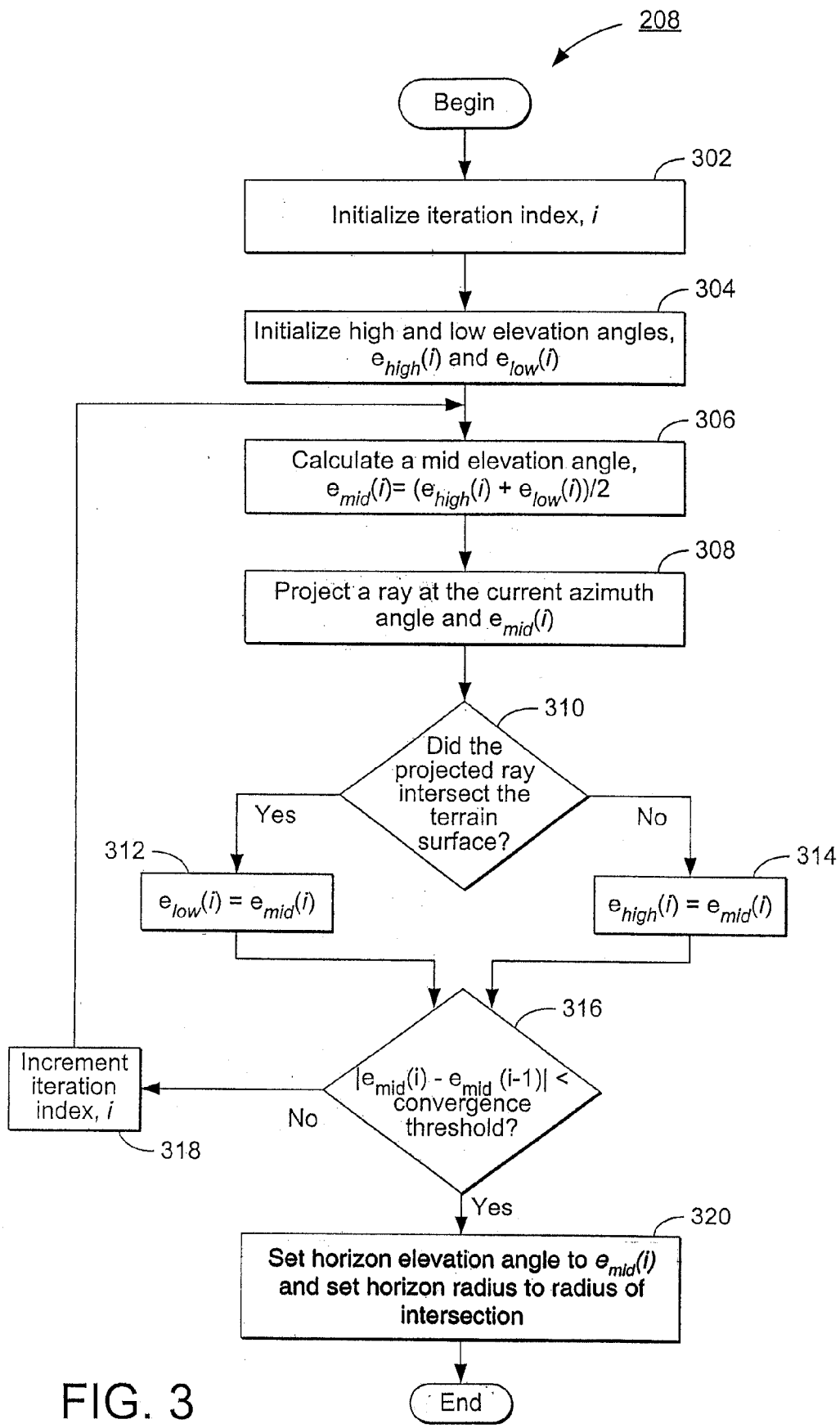
FIG. 3 is a flowchart illustrating an operational sequence directed to determining a horizon elevation angle.

FIG. 3 is a flowchart illustrating the performance of step 208 in greater detail. As described above, for a particular azimuth angle, a horizon elevation angle is determined in this step. This operation involves an iterative process that calculates high, low, and middle elevation angles. These angles are repeatedly calculated until the middle elevation angle converges upon a horizon elevation angle. This iterative approach is referred to herein as binary adaptive searching.

Performance of step 208 begins with a step 302. In this step, an iteration index is set to an initial value, such as zero.

Next, in a step 304, high and low elevation angles $e_{high}(i)$ and $e_{low}(i)$ are initialized. This step comprises setting $e_{high}(i)$ to an initial value of +90 degrees and $e_{low}(i)$ to an initial value of −90 degrees. However, other initial values may be employed.

In step 306, a corresponding middle elevation angle, $e_{mid}(i)$, is calculated. This calculation is made according to Equation (1).

$$e_{mid}(i) = \frac{e_{low}(i) + e_{high}(i)}{2} \qquad (1)$$

In a step 308, a ray is projected from observation point 104 at the current azimuth angle and elevation angle $e_{mid}(i)$.

In a step 310, it is determined whether the ray projected in step 308 intersects terrain surface 102. If such an intersection occurred, then a step 312 is performed. Otherwise, a step 314 is performed.

In step 312, the low elevation angle, $e_{low}(i)$, is adjusted. Performance of this step comprises setting the value of $e_{low}(i)$ to the value of $e_{mid}(i)$.

In step 314, $e_{high}(i)$ is adjusted. This adjustment includes setting the value of $e_{high}(i)$ to the value of $e_{mid}(i)$.

After the performance of either step 312 or step 314, a step 316 is performed. Step 316 determines whether $e_{mid}(i)$ has converged upon a horizon elevation angle. Performance of step 316 comprises the step of determining whether the difference between the current middle elevation angle, $e_{mid}(i)$, and the previous middle elevation angle, $e_{mid}(i-1)$, is less than a convergence threshold, C. This determination is expressed below in Equation (2).

$$|e_{mid}(i) - e_{mid}(i-1)| < C \qquad (2)$$

During a first performance of step 316 for a particular azimuth angle, step 316 will not indicate convergence. If $e_{mid}(i)$ has not converged upon a horizon elevation angle, then a step 318 is performed. In step 318, iteration index, i, is incremented by one. After i is incremented, steps 306-316 are repeated.

If $e_{mid}(i)$ has converged upon a horizon elevation angle, then a step 320 is performed. In step 320, the horizon elevation angle that corresponds to the current azimuth angle is set. In addition, the horizon radius is set to the intersection radius of the ray projected in step 308.

Figure 4:
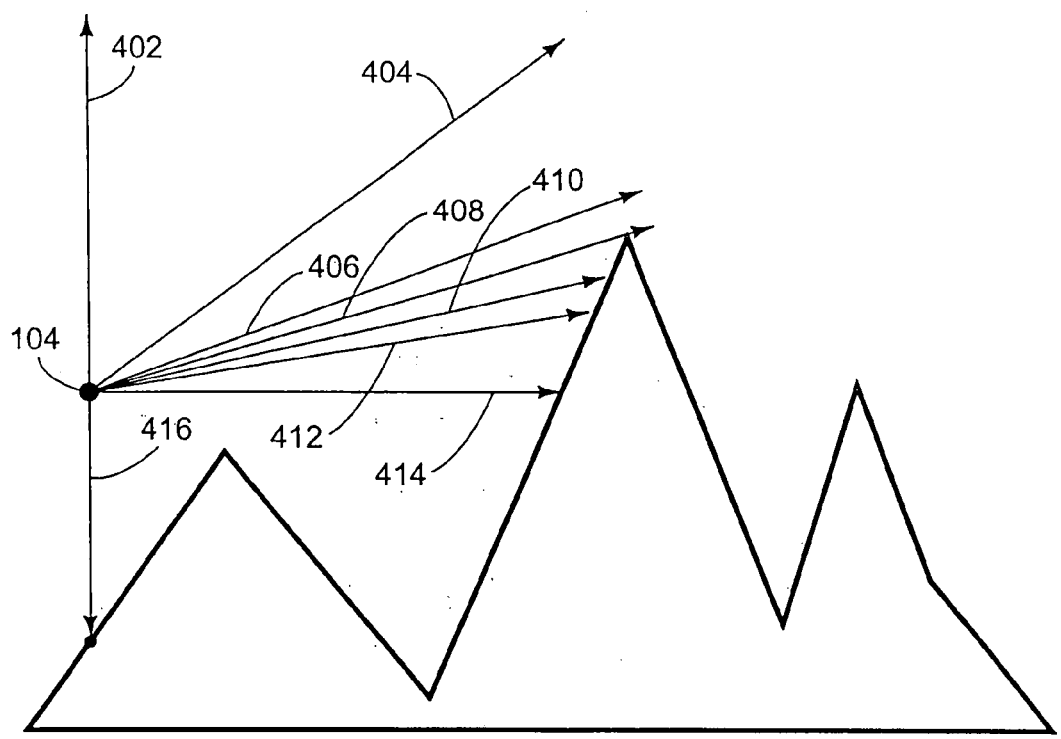
FIG. 4 is a diagram illustrating a plurality of elevation angles.

FIG. 4 is a diagram that illustrates the iterative process that is described above with reference to FIG. 3. In particular this diagram shows a plurality of rays 402-416 projected from observation point 104. Each of these rays has the same azimuth angle. However, these rays are projected at elevation angles that equal $e_{low}(i)$, $e_{mid}(i)$, and $e_{high}(i)$ during various iterations within step 208.

Table 1 is provided below to illustrate an exemplary iterative performance of step 208. In this table, each row represents an iteration, and includes three columns that indicate which of rays 402-416 correspond to $e_{low}(i)$, $e_{mid}(i)$, and $e_{high}(i)$ for the represented iteration.

TABLE 1

| Iteration Index, i | $e_{low}(i)$ | $e_{mid}(i)$ | $e_{high}(i)$ |
|---|---|---|---|
| 1 | 416 | 414 | 402 |
| 2 | 414 | 404 | 402 |
| 3 | 414 | 406 | 404 |
| 4 | 414 | 412 | 406 |
| 5 | 412 | 410 | 406 |
| 6 | 410 | 408 | 406 |

As shown in Table 1, $e_{mid}(i)$ converges at the projection of ray 408. This convergence occurred during six iterations of the process described above with reference to FIG. 3.

As described above with reference to step 204 of FIG. 2, a plurality of horizon coordinates are generated to form a horizon contour. Each of these horizon coordinates includes an azimuth angle and an elevation angle. In step 214, which is within step 204, an azimuth angle is updated for generation of a corresponding horizon elevation angle and a corresponding horizon radius. These values are then stored as a horizon coordinate.

Figure 5:
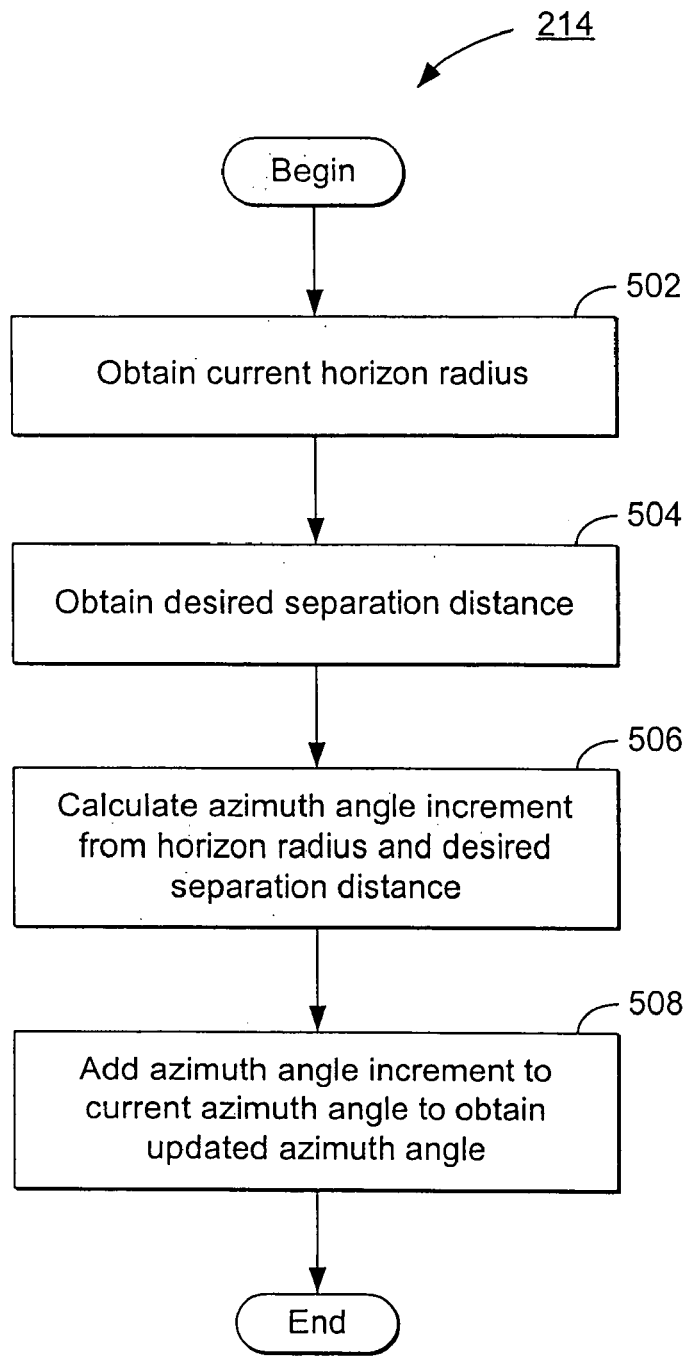
FIG. 5 is a flowchart illustrating an operational sequence directed to updating an azimuth angle.

FIG. 5 is a flowchart illustrating an operation of step 214 in greater detail. This operation advantageously enables the spacing of horizon coordinates across a horizon contour in a substantially uniform manner. This operation begins with a step 502. In step 502 the horizon radius corresponding to the current azimuth angle, $r_{horizon}$ is obtained. Next, in a step 504, a desired separation distance, $d_{desired}$, is obtained. This desired separation distance can be predetermined or user-selectable, and indicates a desired separation expressed as a Euclidean distance in units such as kilometers.

A step 506 follows the performance of step 504. In step 506, an azimuth angle increment, $\Delta az$, is calculated. This calculation is based on the horizon radius obtained in step 502 and the desired separation distance obtained in step 504. Performance of step 506 is expressed below in Equation (3).

$$\Delta az = d_{desired} * r_{horizon} \quad (3)$$

Next, in a step 508, the azimuth angle increment, $\Delta az$, is added to the current azimuth angle to obtain an updated azimuth angle.

Figure 6:
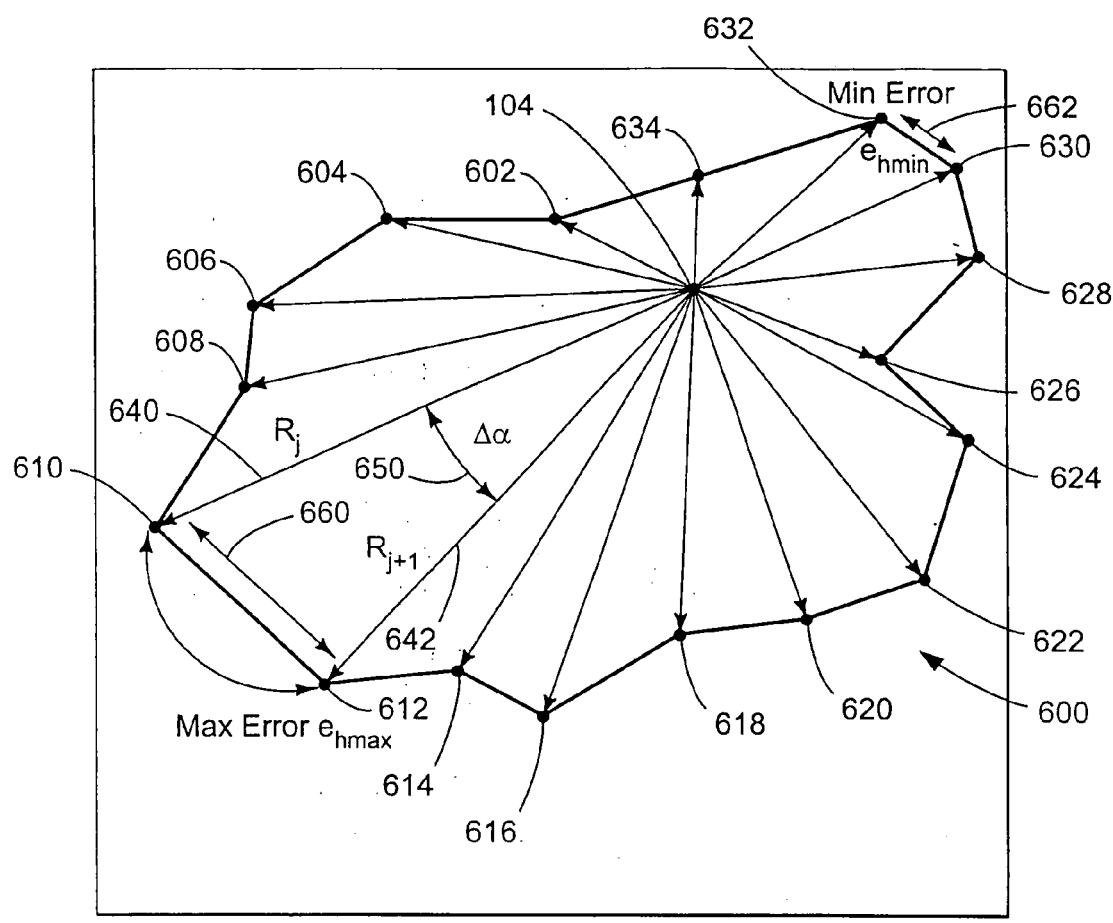
FIG. 6 is a diagram illustrating a plurality of azimuth angles.

FIG. 6 is a diagram illustrating an overhead view of an exemplary horizon contour 600 from the perspective of observation point 104. As described herein, horizon contour 600 includes a plurality of horizon coordinates. These coordinates are shown in FIG. 6 as coordinates 602-634. As described herein, each of these coordinates has an azimuth angle, a horizon elevation angle, and a horizon radius.

Horizon coordinates 610 and 612 provide an illustration of an azimuth angle increment 650, (shown in FIG. 6 as $\Delta\alpha$650) that exists between these coordinates. As shown in FIG. 6, coordinates 610 and 612 are separated by maximum error distance 660. In contrast, coordinates 630 and 632 are separated by a minimum error distance 662. Distances 660 and 662 may be employed to ensure that spacing between adjacent horizon coordinates is within an appropriate range. This distance may be a Euclidean distance, or any other type of distance, as would be apparent to persons skilled in the relevant art(s). If the distance between two adjacent horizon coordinates is greater than maximum error distance 660 or less than minimum error distance 662, then the one or both of these coordinates can be recalculated.

Figure 7:
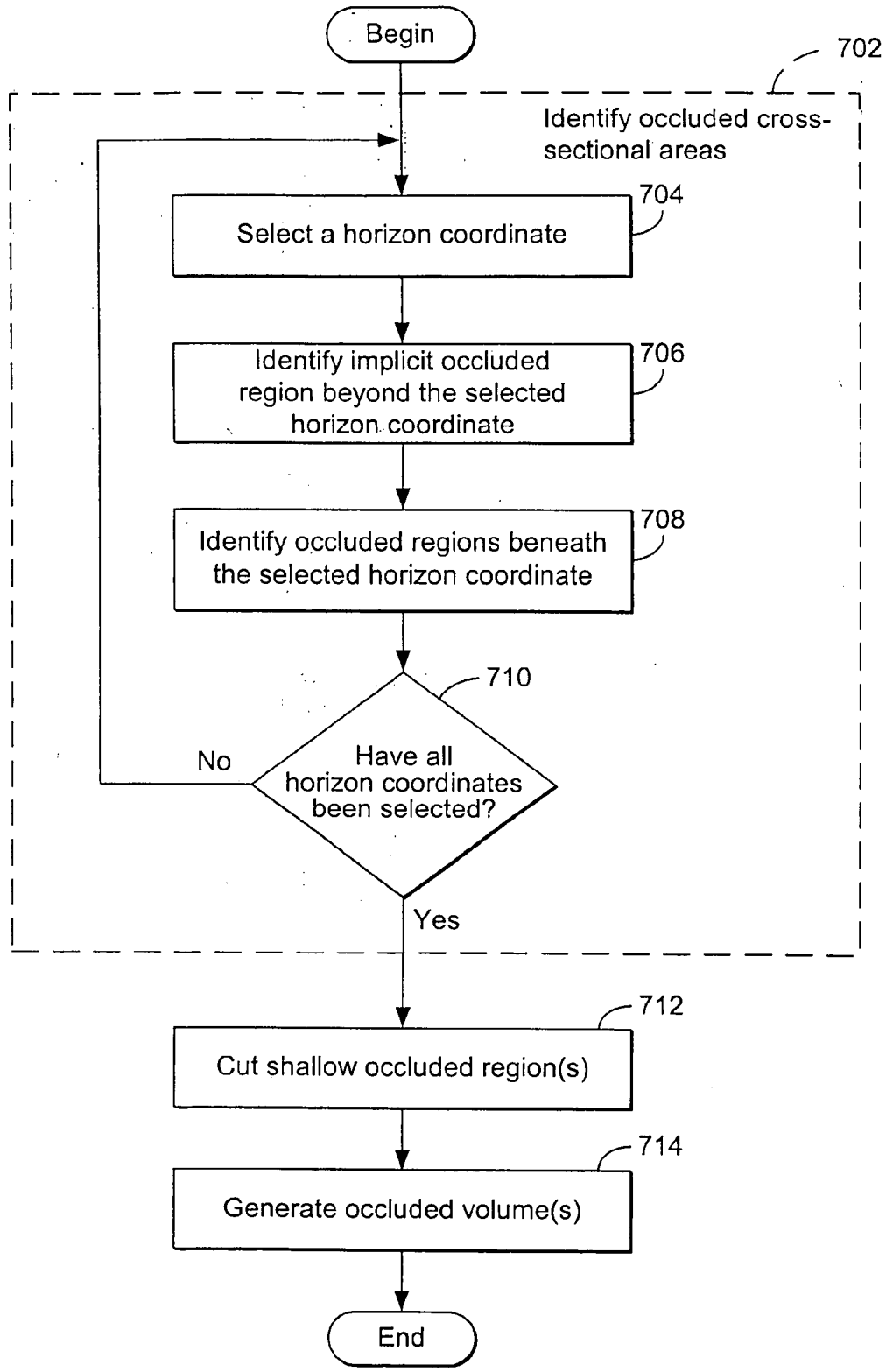
FIG. 7 is a flowchart illustrating an operational sequence directed to the identification of occluded region(s).

FIG. 7 is a flowchart illustrating the performance of step 216 in greater detail (steps 702-714). This operational sequence begins with a step 702. In step 702 one or more occluded cross-sectional areas are identified. Step 702 includes steps 704 through 710. To aid in visualization, step 702 is described with reference to FIG. 8, which is a diagram illustrating an exemplary side view of terrain surface 102.

As described above, step 702 includes steps 704 through 710. In step 704, a horizon coordinate is selected from one of the plurality of horizon coordinates generated in step 204.

Figure 8:
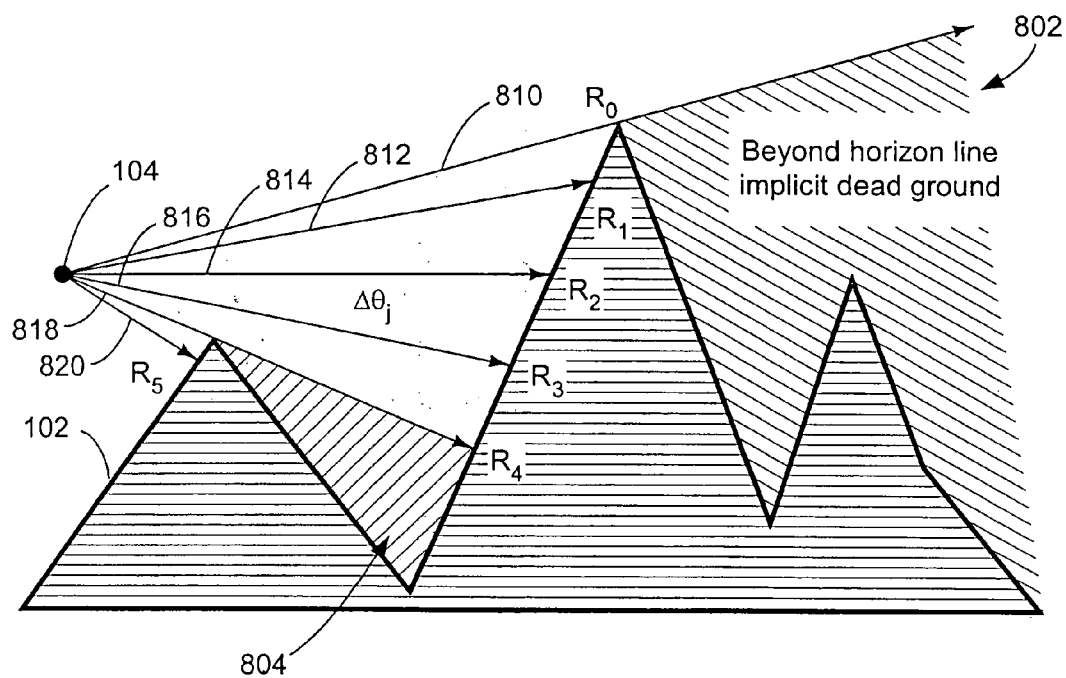
FIG. 8 is a diagram of occluded regions identified at a particular azimuth angle in relation to an observation point.

Next, in a step 706, an implicit occluded region is identified beyond the selected horizon coordinate. Such an occluded region is bounded by a horizon ray projected from observation point 104 through the selected horizon coordinate, such as ray 810 in FIG. 8. In particular, an implicit occluded region is the cross-sectional area that exists between terrain surface 102 and a portion of a horizon ray that is beyond its corresponding horizon coordinate. Referring to FIG. 8, occluded region 802 is an example of an implicit occluded region that is beyond horizon coordinate 830.

A step 708 follows step 706. In step 708, occluded regions that are beneath the selected horizon coordinate are identified. Performance of this step is an iterative process that is described in greater detail with reference to FIG. 9.

Figure 9:
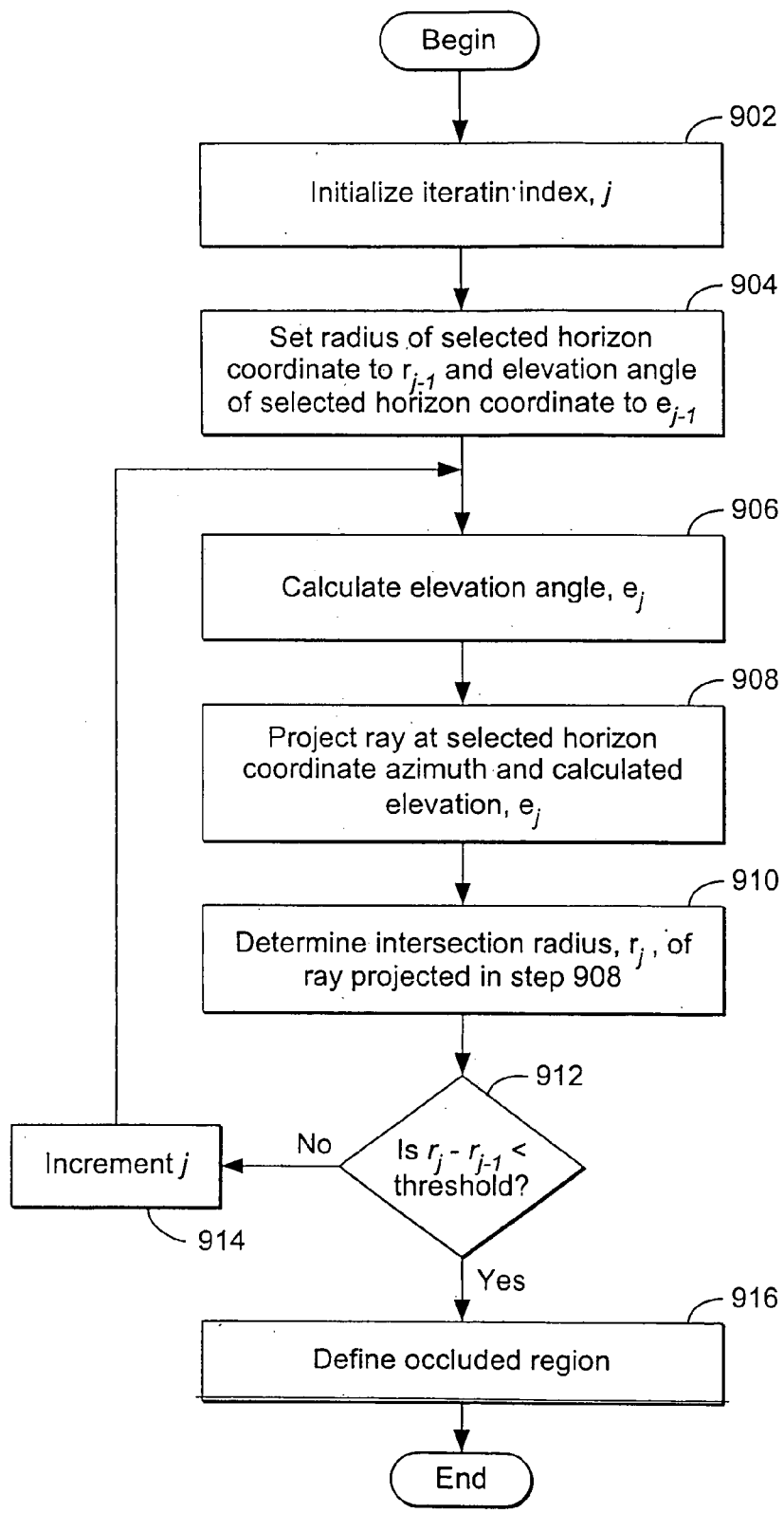
FIG. 9 is a flowchart illustrating the identification of occluded regions that are beneath a horizon coordinate.

As shown in FIG. 9, step 708 commences with a step 902 of initializing an iteration index, j. Next, in a step 904, the horizon radius and the horizon elevation angle of the coordinate selected in step 704 are set to previous iteration values $r_{j-1}$ and $e_{j-1}$, respectively.

A step 906 follows step 904. In this step, an elevation angle for the current iteration, $e_j$, is calculated. This step comprises decreasing $e_{j-1}$ by a predetermined amount, $\Delta\theta_j$.

Next, in a step 908, a ray is projected from observation point 104 at the azimuth angle of the horizon coordinate selected in step 704 and elevation angle, $e_j$. In step 910, an intersection radius, $r_j$, is determined. This radius is the distance from observation point 104 at which the ray projected in step 908 intersects terrain surface 102.

In a step 912, $r_j$ and $r_{j-1}$ are compared. If the difference between these values is greater than a predetermined threshold, then a step 916 is performed. Otherwise, operation proceeds to a step 914. In step 914, j is incremented. After step 914, operation returns to step 906.

In step 916, an occluded region beneath the horizon coordinate selected in step 704 is defined. This occluded region is bounded by an occlusion ray projected from observation point 104 at the azimuth angle of the coordinate selected in step 704 and the previous elevation angle $e_{j-1}$, such as ray 818 in FIG. 8. Other suitable elevation angles may be employed. In particular, this occluded region is the cross sectional .area that exists between terrain surface 102 and a portion of a occlusion ray that is between observation point 104 and the point where it intersects terrain surface 102.

Referring to FIG. 8, occluded region 804 is an example of an occluded region that is beneath horizon coordinate 830. Rays 810 through 820 illustrate an exemplary performance of step 708. Each of rays 810 through 820 have a corresponding intersection radius. that indicates the distance along the ray between observation point 104 and the nearest intersection with terrain surface 102. For example, FIG. 8 illustrates an $R_0$ that corresponds to ray 810, an $R_1$ that corresponds to ray 812, an $R_2$ that corresponds to ray 814, an $R_3$ that corresponds to ray 816, an $R_4$ that corresponds to ray 818, and an $R_5$ that corresponds to ray 820.

Referring once again to FIG. 7, a step 710 is performed after step 708. In step 710, it is determined whether all of the stored horizon coordinates have been selected. If so, then a step 712 is performed. Otherwise, operation returns to step 704.

In step 712, any shallow occluded regions that were identified in step 702 are culled. This step includes disregarding the shallow region's status as an occluded region. Performance of step 712 is optional. This step is described below in greater detail with reference to FIG. 10.

After step 712, an optional step 714 is performed. In step 714, one or more g occluded volumes are generated. Performance of this step includes interpolating volumes from the occluded cross-sectional areas identified in step 702.

For many applications, shallow occluded regions are of little significance. For example, in the context of tactical mission planning, shallow occluded regions of less than two meters do not occlude the presence of relevant objects, such as ground-based and aerial vehicles. Therefore, as described above with reference to step 712, this exemplary implementation provides for shallow occluded regions to be culled.

Figure 10:
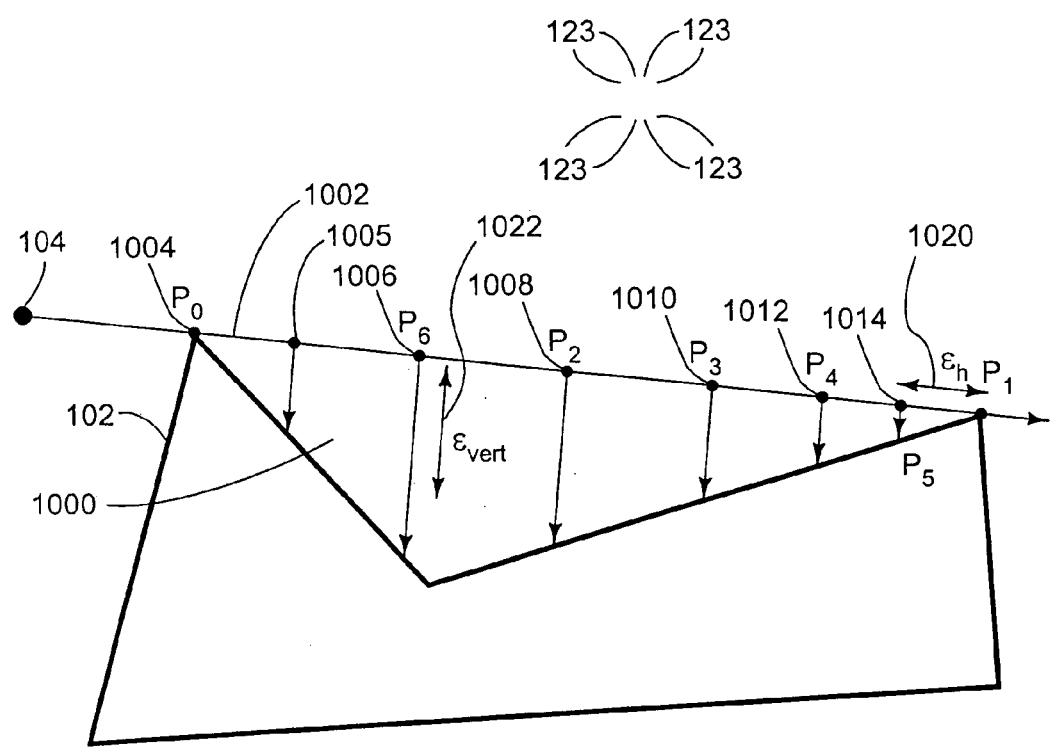
FIG. 10 is a diagram illustrating a technique of measuring occluded region depth.

FIG. 10 is a diagram illustrating a technique of measuring a depth of an occluded region 1000. In FIG. 10, an occlusion ray 1002 generated as described above with reference to FIGS. 7 and 9 defines an edge of occluded region 1000. The depth of occluded region 1000 is determined by measuring, the distance between occlusion ray 1002 and terrain surface 102 at various locations within occluded region 1000.

These locations are points spaced along occlusion ray 1002. As shown in FIG. 10, points 1004, 1005, 1006, 1008, 1010, 1012, and 1014 are uniformly spaced by separation distance 1020. However, other spacing schemes, may be employed. At each of these points, a tangential distance is measured from occlusion ray 1002 to terrain surface 102. If none of these distances are greater than minimum depth 1022, then the occluded region is identified as a shallow occluded region and culled.

Figure 11:
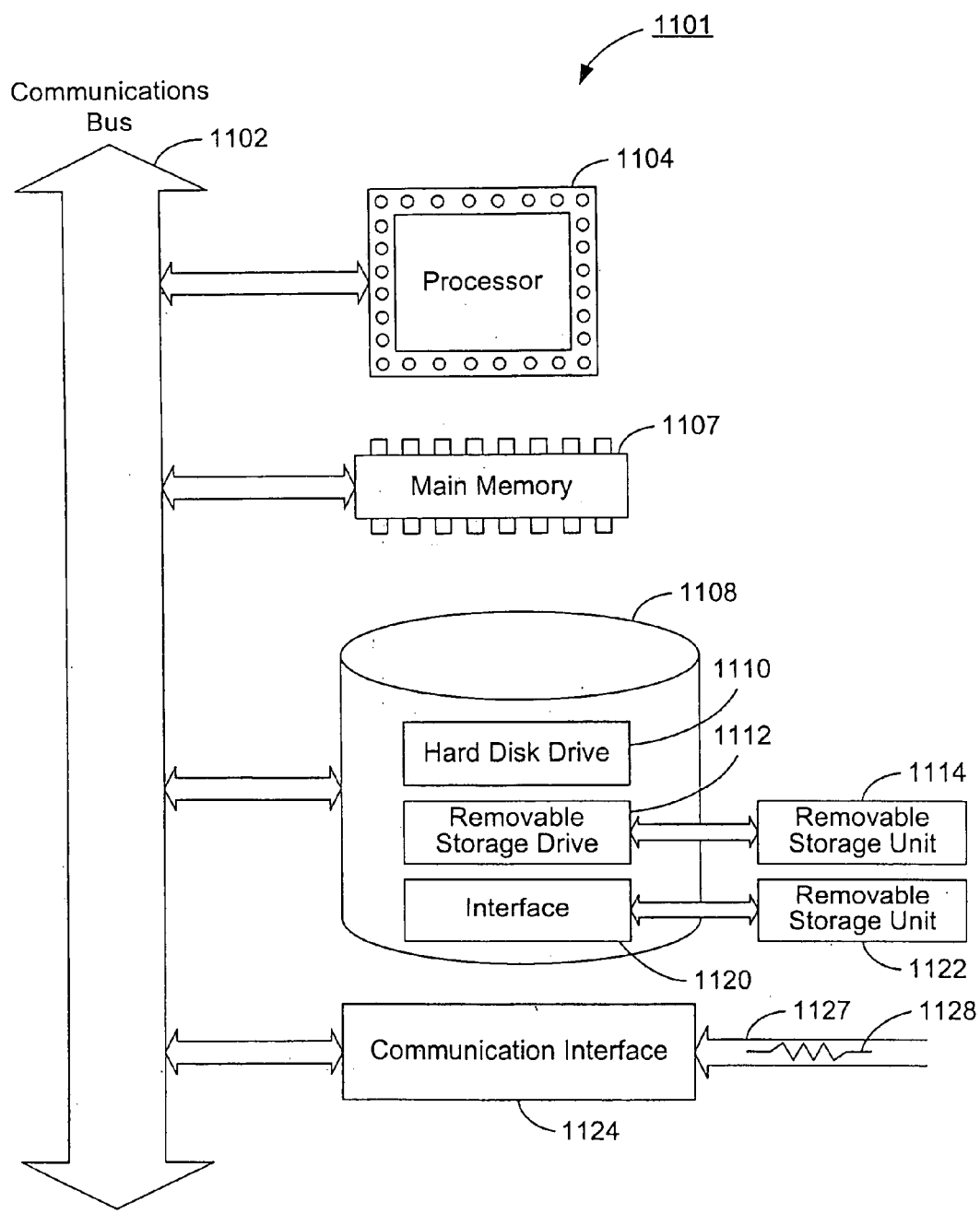
FIG. 11 is a block diagram of an exemplary computer system.

The concepts described herein may be implemented using hardware, software or a combination thereof and may be implemented in a computer system or other processing system. An exemplary computer system 1101 implementation is shown in FIG. 11. Computer system 1101 includes one or more processors, such as a processor 1104. The processor 1104 is connected to a communication bus 1102. Various software embodiments are described in terms of this example computer system. After reading this description, it will become apparent to persons skilled in the relevant art how to implement the invention using other computer system and/or computer architectures.

Computer system 1102 also includes a main memory 1106, preferably random access memory (RAM), and can also include a secondary memory. 1108. The secondary memory 1108 can include, for example, a hard disk drive 1110 and/or a removable storage drive 1112, representing a floppy disk drive, a magnetic tape drive, an optical disk drive, etc. The removable storage drive 1112 reads from and/or writes to a removable storage unit 1114 in a well known manner. Removable storage unit 1114, represents a floppy disk, magnetic tape, optical disk, etc. which is read by and written to by removable storage drive 1112. As will be appreciated, the removable storage unit 1114 includes a computer usable storage medium having stored therein computer software and/or data.

In alternative embodiments, secondary memory 1108 may include other similar means for allowing computer programs or other instructions to be loaded into computer system 1101. Such means can include, for example, a removable storage unit 1122 and an interface 1120. Examples of such can include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1101.

Computer system 1101 can also include a communications interface 1124. Communications interface 1124 allows software and data to be transferred between computer system 1101 and external devices. Examples of communications interface 1124 can include a modem, a network interface (such as an Ethernet card), a communications port, a PCMCIA slot and card, etc. Software and data transferred via communications interface 1124 are in the form of signals which can be electronic, electromagnetic, optical or other signals capable of being received by communications interface 1124. These signals 1126 are provided to communications interface via a channel 1128. This channel 1128 carries signals 1126 and can be implemented using wire or cable, fiber optics, a phone line, a cellular phone link, an RF link and other communications channels.

In this document, the terms "computer program medium" and "computer usable medium" are used to generally refer to media such as removable storage device 1112, a hard disk installed in hard disk drive 1110, and signals 1126. These computer program products are means for providing software to computer system 1101.

Computer programs (also called computer control logic) are stored in main memory and/or secondary memory 1108. Computer programs can also be received via communications interface 1124. Such computer programs, when executed, enable the computer system 1101 to perform the features of the present invention as discussed herein. In particular, the computer programs, when executed, enable the processor 1104 to perform the features of the present invention. Accordingly, such computer programs represent controllers of the computer system 1101.

In an embodiment where the invention is implemented using software, the software may be stored in a computer program product and loaded into computer system 1101 using removable storage drive 1112, hard drive 1110 or communications interface 1124. The control logic (software), when executed by the processor 1104, causes the processor 1104 to perform the functions described herein.

In another exemplary description hardware components such as application specific integrated circuits (ASICs) can be used to implement the functionality described herein. Implementation of the hardware state machine so as to perform the functions described herein will be apparent to persons skilled in the relevant art(s).

In yet another embodiment, the invention is implemented using a combination of both hardware and software. Examples of such combinations include, but are not limited to, microcontrollers.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:

selecting an observation point;

defining a horizon with respect to the observation point by projecting a plurality of rays from the observation point to both above and below the horizon in an iterative process that is accomplished by binary adaptive searching; and determining a cross-sectional area of a region that is occluded from the observation point and is beneath the horizon.

2. The method of claim 1, wherein determining the cross-sectional area of the occluded region comprises projecting at least one ray from the observation point to a terrain surface beneath the horizon.

3. The method of claim 1, further comprising determining a depth of the occluded region.

4. The method of claim 1, further comprising determining a volume of the occluded region.

5. A method comprising:

defining a horizon with respect to an observation point;

projecting a first ray having a first radius onto a terrain surface that is below the horizon;

projecting a second ray having a second radius onto the terrain surface and below the first ray; and detecting a presence of a region that is occluded from the observation point and is beneath the horizon by comparing the first radius and the second radius.

6. The method of claim 5, wherein defining the horizon with respect to the observation point comprises projecting a plurality of rays both above and below the horizon in an iterative process.

7. The method of claim 6, wherein the iterative process is accomplished by binary adaptive searching.

8. The method of claim 5, wherein the presence of the occluded region is detected if an absolute value of a difference between the first radius and the second radius is greater than a threshold value.

9. A computer-readable storage medium comprising computer-executable instructions that, when executed, direct a computing-based device to perform acts comprising:

defining a horizon with respect to an observation point by projecting a plurality of rays both above and below the horizon in an iterative process that is accomplished by binary adaptive searching;

locating a region that is occluded from the observation point and is beneath the horizon; and defining the occluded region.

10. The computer-readable storage medium of claim 9, wherein locating the occluded region comprises projecting a first ray with a first radius and a second ray with a second radius, and comparing the first and second radii.

11. The computer-readable storage medium of claim 9, wherein defining the occluded region comprises determining a depth of the occluded region.

12. The computer-readable storage medium of claim 9, wherein defining the occluded region comprises determining a cross-sectional area of the occluded region.

13. The computer-readable storage medium of claim 9, wherein defining the occluded region comprises determining a volume of the occluded region.

* * * * *